Sept. 3, 1935.  F. R. CHESTER  2,013,265
ICE CREAM SCOOP AND THE LIKE
Filed Aug. 15, 1933
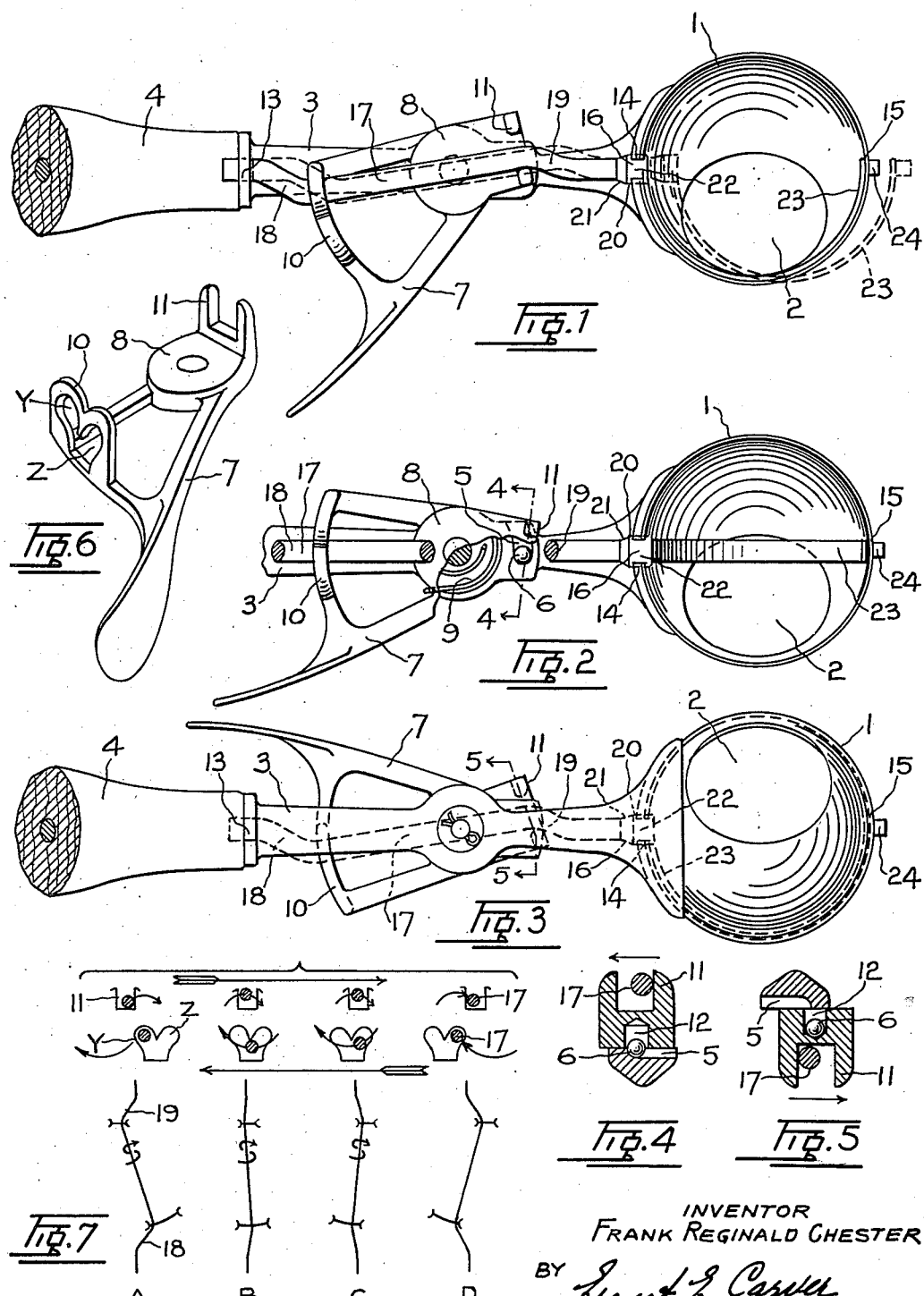
INVENTOR
FRANK REGINALD CHESTER
BY Ernest E. Carver
ATTORNEY Patented Sept. 3, 1935

2,013,265

UNITED STATES PATENT OFFICE 2,013,265

ICE CREAM SCOOP AND THE LIKE

Frank Reginald Chester, Vancouver, British Columbia, Canada, assignor to Chester Bros. Ltd., Vancouver, British Columbia, Canada Application August 15, 1933, Serial No. 685,202

14 Claims. (Cl. 107—48)

My invention relates to improvements in ice cream scoops and the like which are particularly adapted for use by the retail trade. The objects of the invention are to provide means whereby the inherent qualities of ice cream are relied upon to hold the commodity within the scoop until the moment that it is desired to dispense it and to provide a mechanism for operating the knife which is simple and capable of being easily removed for cleaning purposes or for replacement as may be required.

The invention consists essentially of a scoop having an apertured receptacle, a semi-rotary knife for severing ice cream from the surfaces of said receptacle and a crank and lever mechanism for operating the knife, as will be more fully described in the following specification and shown in the accompanying drawing, in which:—

Fig. 1 is a plan view of the invention indicating in dotted line the manner of removing the knife.

Fig. 2 is a plan view showing the knife at the half stroke position.

Fig. 3 is a plan view of the scoop inverted with the knife at the end of its stroke.

Fig. 4 is a sectional view taken on the line 4—4 of Figure 2 as when the knife is in half stroke position.

Fig. 5 is a sectional view taken on the line 5—5 of Figure 3 as when the knife is at the end of its stroke.

Fig. 6 is a view of the operating lever.

Fig. 7 is a diagrammatic view showing progressive positions of the parts of the knife operating mechanism.

In the drawing like characters of reference indicate corresponding parts in each figure.

The numeral 1 indicates a receptacle which is preferably semi-spherical in form and is provided with an eccentrically disposed aperture 2 in its wall, the object of which will hereinafter appear. The receptacle is mounted upon a shank 3 which is provided with a handle 4. Intermediate the length of the shank is a transverse groove 5 which terminates just beyond its longitudinal axis and is adapted normally to serve as a track for a ball 6, see Figures 2, 4, and 5. Pivotally mounted upon the shank is an operating lever 7 which consists of a boss 8 which is recessed on its underside to accommodate a spring 9, see Figure 2, for the purpose of returning the lever to normal position as shown in Figure 1. Extending from the boss rearwardly is an apertured plate 10 forming a V-shaped cam in which the legs Y and Z are each reversely curved. Extending from the forward end of the boss and to a lesser distance than the plate 10 is an upstanding fork 11 in the base of which is an inverted recess 12, see Figures 4 and 5, capable of engaging the upper half of the ball 6 when the device is in normal position and wholly receiving said ball when the device is inverted, thus allowing the ball to pass beyond the end wall of the groove 5 in the shank 3 as shown in Figure 5.

Bearings 13, 14, and 15 are provided respectively at each end of the shank 3 and at the forward edge of the receptacle 1, the bearing 14 being cut away at its top edge to form a gap 16. Journalled in the bearings 13 and 14 is a shaft 17 which is bent to form two cranks 18 and 19. The shaft is provided at its outer end with an enlargement 20 which is tapered at the inner end as at 21 and is cylindrical at its outer end as at 22 to fit the bearing 14.

The gap 16 is slightly greater in width than the shaft 17 so as to permit said shaft to pass through when it is drawn forwardly to the position shown in dotted lines in Figure 1. Secured to the free end of the enlargement 20 is a semi-circular knife 23 having a pivot pin 24 at its free end which is journalled in the bearing 15.

The normal operation of a scoop is to draw the receptacle into the body of ice cream, to fill it and then to invert the scoop over a dish or in filling cones to turn the scoop onto its side and place the receptacle against the mouth of the cone before completely inverting the cone. With the scoop above described the same operation is followed. On the filling of the receptacle, ice cream extrudes through the aperture 2, thus preventing the material from being unduly compressed in its receptacle 1, as the scoop is being withdrawn pressure is applied to the lever 7 which swings the cam plate 10 from right to left and the fork 11 from left to right until the ball 6 is brought to rest against the end wall of the groove 5 as shown in Figure 4. During this movement the crank 18 is forced downwardly along the leg Y of the cam, thus swinging the crank 17 substantially through the lower right quarter of a circle as indicated in A to B in Figure 7. The gap between the prongs of the fork 11 and the radius through which it swings are such that neither prong engages the crank 19 until the crank 18 is at its lowermost position, but if the strain opposing the knife movement is such as to produce any back lash to the rotation of the shaft, then the fork comes into action and carries both cranks over centre that the crank 18 can be led into the leg Z of the cam plate. The subsequent thrust on the lever 7 against its spring 9 causes the crank 18 to swing upwardly through the lower left hand quarter of its throw, thus carrying with it the knife 23 to sever the adhesion of the cream from the unapertured side wall of the receptacle.

Should the scoop be required for filling cones only, by persons whose practice it is to place the cone upon the face of the receptacle before inverting the scoop, the ball 6 may be dispensed with, so that the stroke of the lever, instead of being stopped at the moment the knife has passed the aperture, will be continuous to the end under sustained pressure upon the lever.

What I claim as my invention is:

1. In a scoop having a receptacle, a knife for breaking the adhesion of the ice cream from the receptacle, and means for operating the knife, said receptacle having a relatively large eccentrically disposed aperture through which ice cream is adapted to extrude during normal filling operation.

2. In a scoop having a receptacle, a knife for breaking the adhesion of the ice cream from the receptacle, and means for operating the knife, said receptacle having a relatively large eccentrically disposed aperture through which ice cream is adapted to extrude during normal filling operation, said aperture being so disposed as to be traversed by the knife in the first part of its cutting stroke.

3. In a scoop having a receptacle, a knife for breaking the adhesion of the ice cream from the receptacle, and means for operating the knife, said receptacle having a relatively large eccentrically disposed aperture through which ice cream is adapted to extrude during normal filling operation, and means for interrupting the movement of the knife intermediate its stroke.

4. In a scoop having a receptacle, a knife for breaking the adhesion of the ice cream from the receptacle, and means for operating the knife, said receptacle having a relatively large eccentrically disposed aperture through which ice cream is adapted to extrude during normal filling operation, and means for interrupting the movement of the knife intermediate its stroke, said knife interrupting means being removable automatically as the scoop is turned to invert the receptacle.

5. In a scoop having a substantially semi-spherical receptacle, a knife for breaking the adhesion of the ice cream from the receptacle, and means for operating the knife, said receptacle having a relatively large eccentrically disposed aperture through which ice cream is adapted to extrude during normal filling operation.

6. In a scoop having a substantially semi-spherical receptacle, a knife for breaking the adhesion of the ice cream from the receptacle, and means for operating the knife, said receptacle having a relatively large eccentrically disposed aperture through which ice cream is adapted to extrude during normal filling operation, said aperture being so disposed as to be traversed by the knife in the first part of its cutting stroke.

7. In a scoop having a substantially semi-spherical receptacle, a knife for breaking the adhesion of the ice cream from the receptacle, and means for operating the knife, said receptacle having a relatively large eccentrically disposed aperture through which ice cream is adapted to extrude during normal filling operation, and means for interrupting the movement of the knife intermediate its stroke.

8. In a scoop having a substantially semi-spherical receptacle, a knife for breaking the adhesion of the ice cream from the receptacle, and means for operating the knife, said receptacle having a relatively large eccentrically disposed aperture through which ice cream is adapted to extrude during normal filling operation, and means for interrupting the movement of the knife intermediate its stroke, said knife interrupting means being removable automatically as the scoop is turned to invert the receptacle.

9. In a scoop having a receptacle and a semi-rotary knife for sweeping the inner surfaces of the receptacle, a shaft supporting the knife, a crank upon the shaft and a cam engaging the crank adapted to move transversely of the shaft and to swing said crank throughout its throw and past centre, and further means for carrying said crank past centre.

10. In a scoop having a receptacle and a semi-rotary knife for sweeping the inner surfaces of the receptacle, a shaft supporting the knife, a crank upon the shaft and a pivotally mounted cam engaging the crank adapted to swing transversely of the shaft and to swing said crank throughout its throw, a further crank upon said shaft adapted to pass centre in swinging throughout its throw, and a fork adapted to engage said second crank to carry it past centre.

11. In a scoop having a receptacle and a semi-rotary knife for sweeping the inner surfaces of the receptacle, a shaft supporting the knife, a crank upon the shaft, a single plate having a substantially V-shaped cam slot engaging said crank to impart semi-rotation to it as the plate is moved transversely of the shaft.

12. In a scoop having a receptacle and a semi-rotary knife for sweeping the inner surfaces of the receptacle, a shaft supporting the knife, a crank upon the shaft and a single cam plate having a slot through which the crank extends, said cam plate being adapted for transverse movement across the shaft to impart semi-rotary movement to the shaft, said shaft and knife being mounted between end bearings whereby the springing of the knife from one bearing permits the removal of the shaft from the scoop.

13. The combination with a shaft, a crank upon the shaft, a cam engaging the crank adapted for movement transversely of the shaft and to swing the crank through a substantially semi-circular arc and past centre, and further means for carrying the crank past centre.

14. The combination with a shaft, a crank upon the shaft, a cam pivotally engaging the crank adapted for movement transversely of the shaft and to swing the crank through a substantially semi-circular arc, a second crank upon the shaft adapted to pass centre in swinging throughout its throw and a fork for engaging said crank to carry it past centre.

FRANK REGINALD CHESTER.